(12) United States Patent
Choi et al.

(10) Patent No.: US 9,113,080 B2
(45) Date of Patent: Aug. 18, 2015

(54) METHOD FOR GENERATING THUMBNAIL IMAGE AND ELECTRONIC DEVICE THEREOF

(71) Applicant: Samsung Electronics Co., Ltd., Gyeonggi-do (KR)

(72) Inventors: Young-Keun Choi, Gyeonggi-do (KR); Ji-Hea Park, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 38 days.

(21) Appl. No.: 13/964,637

(22) Filed: Aug. 12, 2013

(65) Prior Publication Data

US 2014/0104477 A1   Apr. 17, 2014

(30) Foreign Application Priority Data

Oct. 16, 2012 (KR) .................. 10-2012-0114969

(51) Int. Cl.
*H04N 5/228* (2006.01)
*H04N 5/232* (2006.01)
*G11B 27/28* (2006.01)
*G11B 27/34* (2006.01)

(52) U.S. Cl.
CPC ............ *H04N 5/23293* (2013.01); *G11B 27/28* (2013.01); *G11B 27/34* (2013.01)

(58) Field of Classification Search
USPC .............. 348/333.01, 333.02, 222.1; 382/190
IPC .................. H04N 5/232,5/23293; G11B 27/28, G11B 27/34
See application file for complete search history.

(56) References Cited

U.S. PATENT DOCUMENTS

| | | | |
|---|---|---|---|
| 2002/0089516 A1 | 7/2002 | Sobol | |
| 2006/0064716 A1 | 3/2006 | Sull et al. | |
| 2009/0208118 A1 | 8/2009 | Csurka | |
| 2009/0244320 A1 | 10/2009 | Ito | |
| 2010/0128986 A1* | 5/2010 | Xu | 382/190 |

FOREIGN PATENT DOCUMENTS

| | | |
|---|---|---|
| EP | 1355270 A2 | 10/2003 |
| EP | 2405437 A1 | 1/2012 |
| KR | 10-0811796 B1 | 3/2008 |
| KR | 10-2010-0116877 A | 11/2010 |

* cited by examiner

*Primary Examiner* — Yogesh Aggarwal
(74) *Attorney, Agent, or Firm* — Cha & Reiter, LLC.

(57) ABSTRACT

A method of displaying a thumbnail image and an electronic device thereof are provided. The method of displaying the thumbnail image of the electronic device includes detecting meta data and object information for an image, determining an aspect ratio of the thumbnail image with respect to the image on the basis of the detected meta data and object information, and displaying the thumbnail image with respect to the image according to the determined aspect ratio.

20 Claims, 11 Drawing Sheets

METHOD FOR GENERATING THUMBNAIL IMAGE AND ELECTRONIC DEVICE THEREOF

CROSS RELATED APPLICATION

This application claims the benefit of priority under 35 U.S.C. §119(a) of a Korean patent application filed in the Korean Intellectual Property Office on Oct. 16, 2012 and assigned Serial No. 10-2012-0114969, the entire disclosure of which is hereby incorporated by reference.

BACKGROUND

1. Field of the Invention

The present disclosure relates to an image display. More particularly, the present invention relates to a method and apparatus for generating a thumbnail image in an electronic device.

2. Description of the Related Art

With the development of a function of an electronic device in recent years, the electronic device can store a plurality of images and display the stored images according to a user control. More particularly, when an application for displaying the stored images is executed, the electronic device resizes or crops the images stored in the electronic device according to a size of a window provided by the application, and thereafter displays the resized or cropped images. In this case, the image which is resized or cropped according to the size of the window provided by the electronic device is called a thumbnail image. The thumbnail image can be provided in a different size according to the electronic device and the application.

As described above, since the conventional thumbnail image is provided in a different size according to the electronic device and the application, the electronic device can provide an image in which an area not desired by a user is cut off. For one example, in case of a person image, the electronic device can provide an image in which a face area is cut off according to an application for displaying the image. Additionally, in case of a scenery image, the electronic device can provide an image in which a desired scenery area is cut off according to the application for displaying the image. As used herein "scenery image" can be used to designate a landscape image and "person image" can be used to designate a "portrait image".

Accordingly, there is a need for a method of providing an image optimized for a user without an additional image editing process.

SUMMARY

An aspect of the present invention is to solve at least the above-mentioned problems and/or disadvantages and to provide at least the advantages described below. Accordingly, an aspect of the present invention is to provide a method and apparatus for generating a thumbnail image in an electronic device.

Another aspect of the present invention is to provide a method and apparatus for determining an aspect ratio of a thumbnail image on the basis of metadata and object information for an image in an electronic device.

Another aspect of the present invention is to provide a method and apparatus for determining a representative area on the basis of metadata and object information for an image in an electronic device and for generating a thumbnail image by using the determined representative area.

Another aspect of the present invention is to provide a method and apparatus for regulating a size of an image so that a representative area of the image is fully displayed in a display window in an electronic device.

In accordance with an aspect of the present invention, a method of displaying a thumbnail image of an electronic device having a processor is provided. The method includes detecting metadata and object information for an image stored in a data storage unit, determining an aspect ratio of a thumbnail image to be displayed with respect to the image on the basis of the detected meta data and object information in the processor, and displaying the thumbnail image in a display window of the display with respect to the image according to the determined aspect ratio.

In accordance with another aspect of the present invention, an electronic device is provided. The electronic device preferably includes one or more processors, a touch sensing display, a memory, and one or more programs stored in the memory and configured to be executed by the one or more processors, wherein the program includes an instruction for detecting metadata and object information for an image, for determining an aspect ratio of the thumbnail image with respect to the image on the basis of the detected meta data and object information, and for displaying the thumbnail image with respect to the image according to the determined aspect ratio.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION

Exemplary embodiments of the present invention will be described herein below with reference to the accompanying drawings. For the purposes of clarity and simplicity, well-known functions or constructions are not described in detail as they would obscure the invention in unnecessary detail. Also, the terms used herein are defined according to the functions of the present invention. Thus, the terms may vary depending on user's or operator's intension and usage. That is, the terms used herein must be understood based on the descriptions made herein.

Figure 1A:
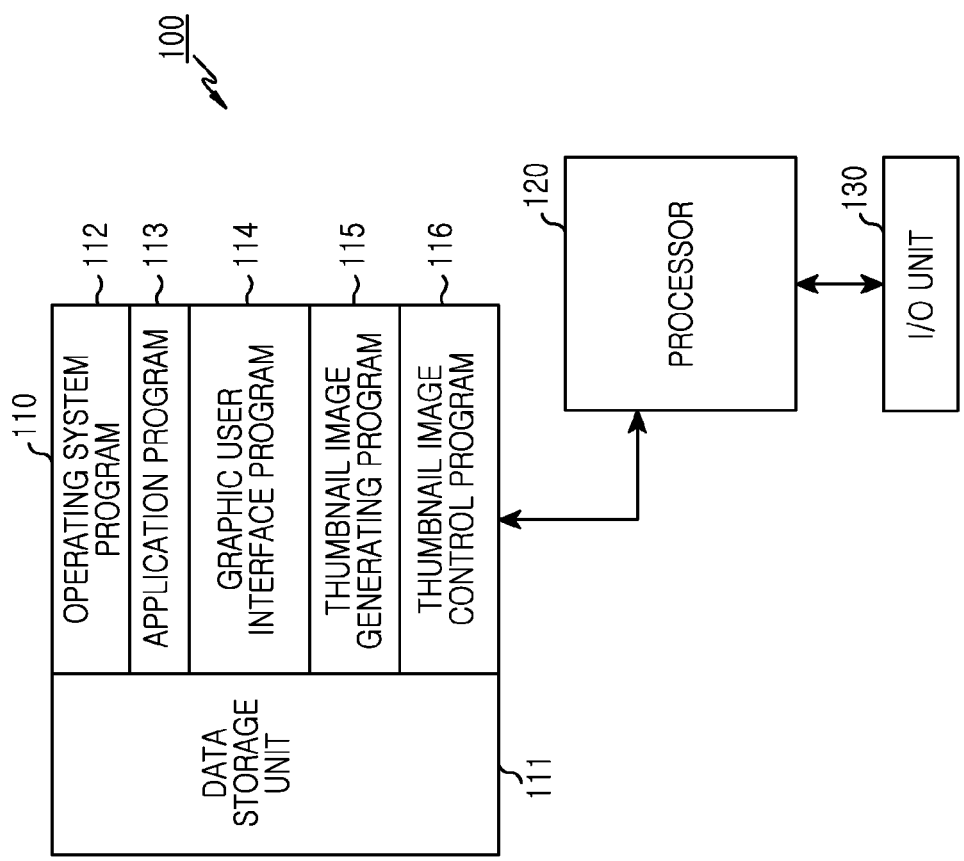
FIG. 1A is a block diagram of an electronic device for generating a thumbnail image according to an exemplary embodiment of the present invention.

An electronic device described hereinafter is typically a mobile communication terminal capable of displaying images, a smart phone, a tablet Personal Computer (PC), a digital camera, an Motion Picture Experts Group Layer 3 (MP3) player, a navigator, a laptop, a net-book, a computer, a television set, a refrigerator, an air conditioner, or any other electronic device capable of displaying an image on a screen FIG. 1A is a block diagram of an electronic device for generating a thumbnail image according to an exemplary embodiment of the present invention.

Referring to FIG. 1A, an electronic device 100 includes a memory 110, a processor 120, and an Input/Output (I/O) unit 130. The memory 110 and the processor 120 may be plural in number. The processor 120 may be part of a controller and/or associated with a microprocessor.

The memory 110 typically includes a data storage unit 111, an operating system program 112, an application program 113, a graphic user interface program 114, a thumbnail image generating program 115, and a thumbnail image control program 116. In addition, since a program which is a software component can be expressed in a group of instructions, the program is also expressed in an instruction set. The program is also expressed in a module.

The memory 110 may store one or more programs including instructions for executing an exemplary embodiment of the present invention.

The data storage unit 111 typically stores data generated while performing a function corresponding to the program stored in the memory 110. The data storage unit 111 of the present invention can store an image received from a server or another electronic device, as well as an image captured by using a camera (not shown). In addition, the data storage unit 111 can store meta data for each stored image.

The operating system program 112 (e.g., a built-in operating system such as WINDOWS, LINUX, Darwin, RTXC, UNIX, OS X, or VxWorks) includes various software components for controlling a general system operation. For example, the control of the general system operation includes memory management and control, storage hardware (device) control and management, power control and management, etc. The operating system program 112 performs a function for facilitating communication between various hardware components (devices) and software components (programs).

The application program 113 typically includes a number of applications, common applications include a browser, email, a message application, word processing application, an address book, a widget, a Digital Right Management (DRM) application, voice recognition, voice recording, a location determining function, a location based service, and a telephone.

The graphic user interface program 114 typically includes at least one software component for providing a graphic-based user interface between the user and the electronic device 100. More particularly, the graphic user interface program 114 often includes at least one software component for displaying user interface information on a touch screen (which may function a part of an I/O unit 130). According to an embodiment of the present invention, the graphic user interface program 114 includes an instruction for displaying an image. In this case, the image includes an image received from a server or another electronic device and an image captured by using a camera (not shown). In addition, the graphic user interface program 114 can display a thumbnail image in a predetermined image display window if an application for displaying an image is executed. Accordingly, the thumbnail image is an image generated by cutting off (i.e., resizing and/or cropping) original images with various sizes and by adjusting an image size according to the image display window.

The thumbnail image generating program 115 detects meta data information for an image and information of an object indicated by the image, and generates the thumbnail image on the basis of the detected meta data information and object information. For example, the meta data can include structured additional information of the image, and include at least one of an image capture time, face recognition information, an exposure value, a flash availability, focus information, a resolution, an image size, and a capture mode.

First, the thumbnail image generating program 115 may recognize a representative object of the image on the basis of the detected meta data information and object information, and thereafter may determine an aspect ratio of the thumbnail image generated according to the recognized representative object. For example, if focus information is included in the meta data for the image, the thumbnail image generating program 115 can recognize the representative object of the image around a center point of an area indicated by the focus information. In this case, if a person is detected within a threshold distance of the area indicated by the focus information, the thumbnail image generating program 115 may determine the representative object of the image as the person, and then can determine a ratio of the image as a ratio of a "portrait type". On the other hand, if the person is detected within the threshold distance of the area indicated by the focus information, the thumbnail image generating program 115 may determine that the representative object of the image is not the person but a scenery and then may determine that a ratio of the image as a ratio of a "landscape type". Herein, the "portrait type" is an image type in which a lengthwise length is longer than a widthwise length, and the "landscape type" is an image type in which the widthwise length is longer than the lengthwise length.

In addition, if an object of an image indicated by the detected meta data is different from an object indicated by object information, the thumbnail image generating program 115 may determine the aspect ratio of the thumbnail image with respect to the image on the basis of information having a high priority between the meta data and the object information, or may determine an area of the thumbnail image. That is, the thumbnail image generating program 115 can allow the object information to have a higher priority than the meta data. In this case, if the object of the image indicated by the detected meta data is different from the object indicated by the object information, the aspect ratio of the thumbnail image or the area of the thumbnail image can be determined on the basis of the object indicated by the object information. In one example, if the meta data for the image confirms that the image is captured in a scenery mode whereas a result of detecting the object of the image confirms that a person is included in the image, the thumbnail image generating program 115 can recognize a representative object of the image as the person according to object information having a high priority, can determine a ratio of the image as a ratio of a portrait type, and can determine an area including the person in a full area of the image as a thumbnail image area. In another example, if the meta data confirms that the image is captured in a person mode whereas the object information confirms that an object indicated by the image is a scenery, the thumbnail image generating program 115 can recognize a representative object of the image as a scenery according to object information having a high priority, can determine a ratio of the image as a ratio of a landscape type, and can determine an area including the scenery in the image as a thumbnail image area.

If the object information is included in the meta data, the thumbnail image generating program 115 can generate the thumbnail image on the basis of meta data instead of confirming object information. For example, if a face of a person is recognized by using a face recognition function when capturing an image, object information is included in meta data for the captured image, and thus the thumbnail image generating program 115 can determine that a representative object of the image is the person and thus can generate a ratio of the image as a ratio of a portrait type instead of performing an additional process of confirming object information.

At the occurrence of an image display event, the thumbnail image control program 116 can determine a representative area of the image and adjusts a size of the image according to a size of an image display window. More particularly, the thumbnail image control program 116 can confirm an aspect ratio of the image display window at the occurrence of the image display event, determine the representative area of the image, and thereafter crop the image or adjusts the size of the image so that the determined representative area of the image can be fully displayed in the display window.

In another example, when a gallery application is executed, the thumbnail image control program 116 confirms a ratio and size of a window provided or utilized by the gallery application. Thereafter, the thumbnail image control program 116 can determine a representative area including a face of a person in the image on the basis of the ratio and size of the window provided by the gallery application, and can crop a to-be-displayed image according to the ratio and size of the window proposed by the gallery application and display the image so that the determined representative area is fully displayed. In another example, when an image display application is executed, the thumbnail image control program 116 can confirm a ratio and size of a window provided by the image display application. Thereafter, the thumbnail image control program 116 can determine an area including a focus area in the to-be-displayed image as a representative image, and can display the to-be-display image by increasing or decreasing its size according to the ratio and size of the window provided by the image display application. In this case, if the representative object of the image is a person, the representative area of the image can be determined as an area including the face of the person. If the representative object of the image is an object, the representative area of the image can be determined to be an area including the object. If the representative object of the image is a scenery, the representative area of the image can be determined to be an area including a focus area or as a center area of the image.

The aforementioned processes performed by the thumbnail image control program 116 can be performed whenever the image display event occurs or only when the image display event initially occurs. That is, since an image is stored by cropping the image or adjusting a size of the image according to a size of a display window at a time when the image display event initially occurs, a pre-stored image can be used when the image display event occurs at a later time.

Although not shown, the processor 120 may consist of at least one processor and a peripheral interface. In addition, the processor 120 typically is capable of executing a specific program (instruction set) stored in the memory 110 to perform a plurality of specific functions corresponding to the program.

The I/O unit 130 often includes an input unit for data input and an output unit for data output, and thus provides an interface to a user. For example, the I/O unit 130 may be a touch screen in which data can be simultaneously input and output. When the I/O unit 130 displays an image, the displayed image may be an image received from another electronic device or an image captured by using a camera (not shown), which may be internal to the electronic device 100. In addition, the I/O unit 130 can receive an input for generating the image display event. For example, the I/O unit 130 can sense a key input or touch for executing a gallery application to display an image from the user. If the image display event occurs, the I/O unit 130 can display at least one thumbnail image which is cropped according to a size of the image display window or of which a size is adjusted.

Figure 1B:
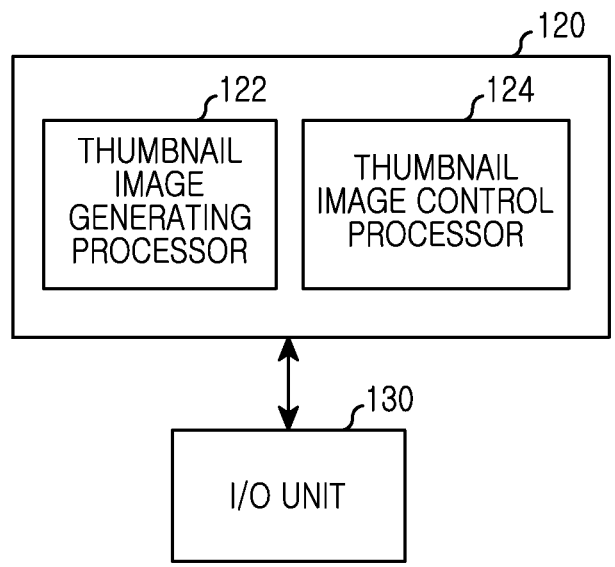
FIG. 1B is a block diagram of a processor for generating a thumbnail image according to an exemplary embodiment of the present invention.

FIG. 1B is a block diagram of a processor for generating a thumbnail image according to an exemplary embodiment of the present invention.

Referring to FIG. 1B, a processor 120 includes a thumbnail image generating processor 122 and a thumbnail image control processor 124.

The thumbnail image generating processor 122 typically detects meta data information for an image and information of an object indicated by the image, and generates a thumbnail image on the basis of the detected meta data information and object information. Generally, the meta data implies structured additional information of the image, and includes at least one of an image capture time, face recognition information, an exposure value, a flash availability, focus information, a resolution, an image size, and a capture mode.

First, the thumbnail image generating processor 122 may recognize a representative object of the image on the basis of the detected meta data information and object information, and thereafter may determine an aspect ratio of the thumbnail image generated according to the recognized representative object. For example, if focus information is included in the meta data for the image, the thumbnail image generating processor 122 can recognize the representative object of the image around a center point of an area indicated by the focus information. In this case, if a person is detected within a threshold distance of the area indicated by the focus information, the thumbnail image generating processor 122 may determine the representative object of the image as the person, and then can determine a ratio of the image as a ratio of a portrait type. On the other hand, if the person is detected within the threshold distance of the area indicated by the focus information, the thumbnail image generating processor 122 may determine that the representative object of the image is not the person but a scenery and then may determine that a ratio of the image as a ratio of a landscape type. Herein, the portrait type is an image type in which a lengthwise length is longer than a widthwise length, and the landscape type is an image type in which the widthwise length is longer than the lengthwise length.

In addition, if an object of an image indicated by the detected meta data is different from an object indicated by object information, the thumbnail image generating processor 122 may determine the aspect ratio of the thumbnail image with respect to the image on the basis of information having a high priority between the meta data and the object information, or may determine an area of the thumbnail image. That is, the thumbnail image generating processor 122 can allow the object information to have a higher priority than the meta data. In this case, if the object of the image indicated by the detected meta data is different from the object indicated by the object information, the aspect ratio of the thumbnail image or the area of the thumbnail image can be determined on the basis of the object indicated by the object information. In one example, if the meta data for the image confirms that the image is captured in a scenery mode whereas a result of detecting the object of the image confirms that a person is included in the image, the thumbnail image generating processor 122 can recognize a representative object of the image as the person according to object information having a high priority, can determine a ratio of the image as a ratio of a portrait type, and can determine an area including the person in a full area of the image as a thumbnail image area. In another example, if the meta data confirms that the image is captured in a person mode whereas the object information confirms that an object indicated by the image is a scenery, the thumbnail image generating processor 122 can recognize a representative object of the image as a scenery according to object information having a high priority, can determine a ratio of the image as a ratio of a landscape type, and can determine an area including the scenery in the image as a thumbnail image area.

If the object information is included in the meta data, the thumbnail image generating processor 122 can generate the thumbnail image on the basis of meta data instead of confirming object information. For example, if a face of a person is recognized by using a face recognition function when capturing an image, object information is included in meta data for the captured image, and thus the thumbnail image generating processor 122 can determine that a representative object of the image is the person and thus can generate a ratio of the image as a ratio of a portrait type instead of performing an additional process of confirming object information.

At the occurrence of an image display event, i.e., when a request is made to display an image, the thumbnail image control processor 124 can determine a representative area of the image and adjusts a size of the image according to a size of an image display window. More specifically, the thumbnail image control processor 124 can confirm an aspect ratio of the image display window at the occurrence of the image display event, determine the representative area of the image, and thereafter clip off or crop the image or adjusts the size of the image so that the determined representative area of the image can be fully displayed in the display window.

In one example, when a gallery application is executed, the thumbnail image control processor 124 confirms a ratio and size of a window provided by the gallery application. Thereafter, the thumbnail image control processor 124 can determine a representative area including a face of a person in the image on the basis of the ratio and size of the window provided by the gallery application, and can crop a to-be-displayed image according to the ratio and size of the window proposed by the gallery application and display the image so that the determined representative area is fully displayed. In another example, when an image display application is executed, the thumbnail image control processor 124 confirms a ratio and size of a window provided by the image display application. Thereafter, the thumbnail image control processor 124 can determine an area including a focus area in the to-be-displayed image as a representative image, and can display the to-be-display image by increasing or decreasing its size according to the ratio and size of the window provided by the image display application. In this case, if the representative object of the image is a person, the representative area of the image can be determined as an area including the face of the person. If the representative object of the image is an object, the representative area of the image can be determined to an area including the object. If the representative object of the image is scenery, the representative area of the image can be determined as an area including a focus area or as a center area of the image.

The aforementioned processes performed by the thumbnail image control processor 124 can be performed each time the image display event occurs or only when the image display event initially occurs. That is, since an image is stored by cutting off or cropping the image or adjusting a size of the image according to a size of a display window at a time when the image display event initially occurs, a pre-stored image can be used when the image display event occurs at a later time.

Figure 2A:
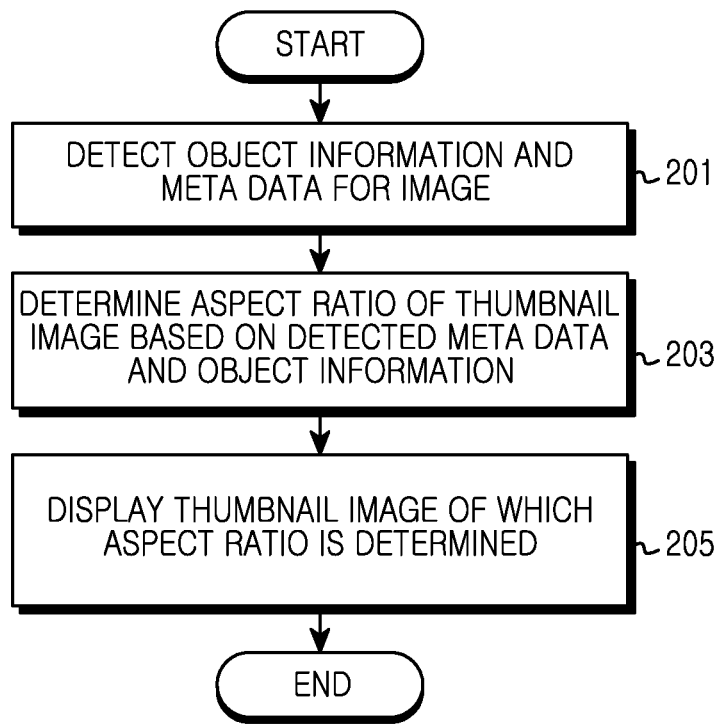
FIG. 2A is a flowchart illustrating a process of determining an aspect ratio of a thumbnail image on the basis of object information and meta data of an image in an electronic device according to an exemplary embodiment of the present invention.

FIG. 2A is a flowchart illustrating a process of determining an aspect ratio of a thumbnail image on the basis of object information and meta data of an image in an electronic device according to an exemplary embodiment of the present invention.

Referring to FIG. 2A, an electronic device 100 detects the object information and meta data for the image in step 201. The meta data for the image implies or includes structured additional information of the image, and includes for example, at least one of an image capture time, face recognition information, an exposure value, a flash availability, focus information, a resolution, an image size, and a capture mode.

In step 203, the electronic device 100 determines an aspect ratio of the thumbnail image on the basis of the detected meta data and object information. First, the electronic device 100 may recognize a representative object of the image on the basis of the detected meta data information and object information, and thereafter may determine an aspect ratio of a thumbnail image generated according to the recognized representative object. For one example, if the representative object of the image recognized on the basis of the meta data information and the object information is a person, the electronic device 100 can determine a ratio of the generated thumbnail image as a ratio of a portrait type. In this case, the ratio of the portrait type implies a ratio in which a lengthwise length is longer than a widthwise length. In another example, if the representative object of the image recognized on the basis of the meta data information and the object information is a scenery, the electronic device 100 can determine a ratio of the generated thumbnail image as a ratio of a landscape type. In this case, the ratio of the landscape type implies a ratio in which a widthwise length is longer than a lengthwise length.

In step 205, the electronic device 100 displays a thumbnail image of which an aspect ratio is determined. In this case, a thumbnail image determined to the ratio of the landscape type may be an image of the same ratio as an image captured in a landscape mode of the electronic device 100, and a thumbnail image determined as the ratio of the portrait type may be an image of the same ratio as an image captured in a portrait mode of the electronic device 100.

Figure 2B:
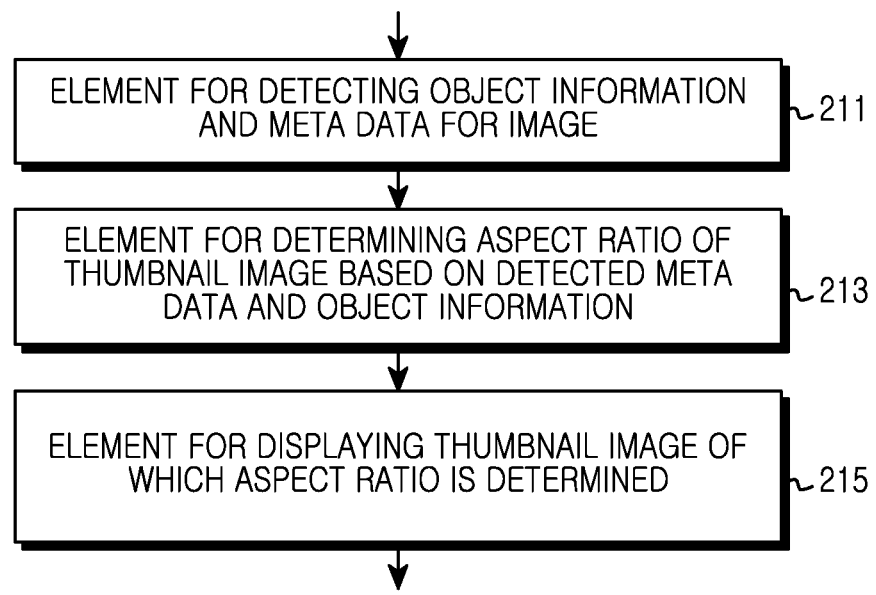
FIG. 2B illustrates an element for determining an aspect ratio of a thumbnail image on the basis of object information and meta data of an image in an electronic device according to an exemplary embodiment of the present invention.

FIG. 2B illustrates an element for determining an aspect ratio of a thumbnail image on the basis of object information and meta data of an image in an electronic device according to an exemplary embodiment of the present invention.

Referring to FIG. 2B, an electronic device may include an element 211 for detecting or reading the object information and meta data for the image. More specifically, the electronic device 100 may include an element for reading meta data including at least one of an image capture time, face recognition information, an exposure value, a flash availability, focus information, a resolution, an image size, and a capture mode for each image. The electronic device 100 may also include an element for detecting whether an objected indicated by the image is a person, a thing or an object, or a scenery. In this case, the electronic device 100 can acquire object information by using a well-known image recognition algorithm and an image recognition algorithm, and optionally can employ a camera (not shown).

In addition, the electronic device 100 often includes an element 213 for determining an aspect ratio of a thumbnail image on the basis of the detected meta data and object information. In one example, the electronic device 100 includes an element for determining a ratio of the thumbnail image as a ratio of a portrait type if the representative object of the image is confirmed as a person. In another example, the electronic device 100 includes an element for determining the ratio of the thumbnail image as a ratio of a landscape type if the representative object of the image is confirmed as a scenery.

In addition, the electronic device 100 often includes an element 215 for displaying a thumbnail image of which an aspect ratio is determined. The electronic device 100 additionally typically includes an element for mapping the thumbnail image, of which an aspect ratio is determined, for each image and an element for storing the image. For example, the electronic device 100 can store the thumbnail image of which an aspect ratio is determined by mapping the image on the basis of a first image and meta data and object information for the first image.

Figure 3:
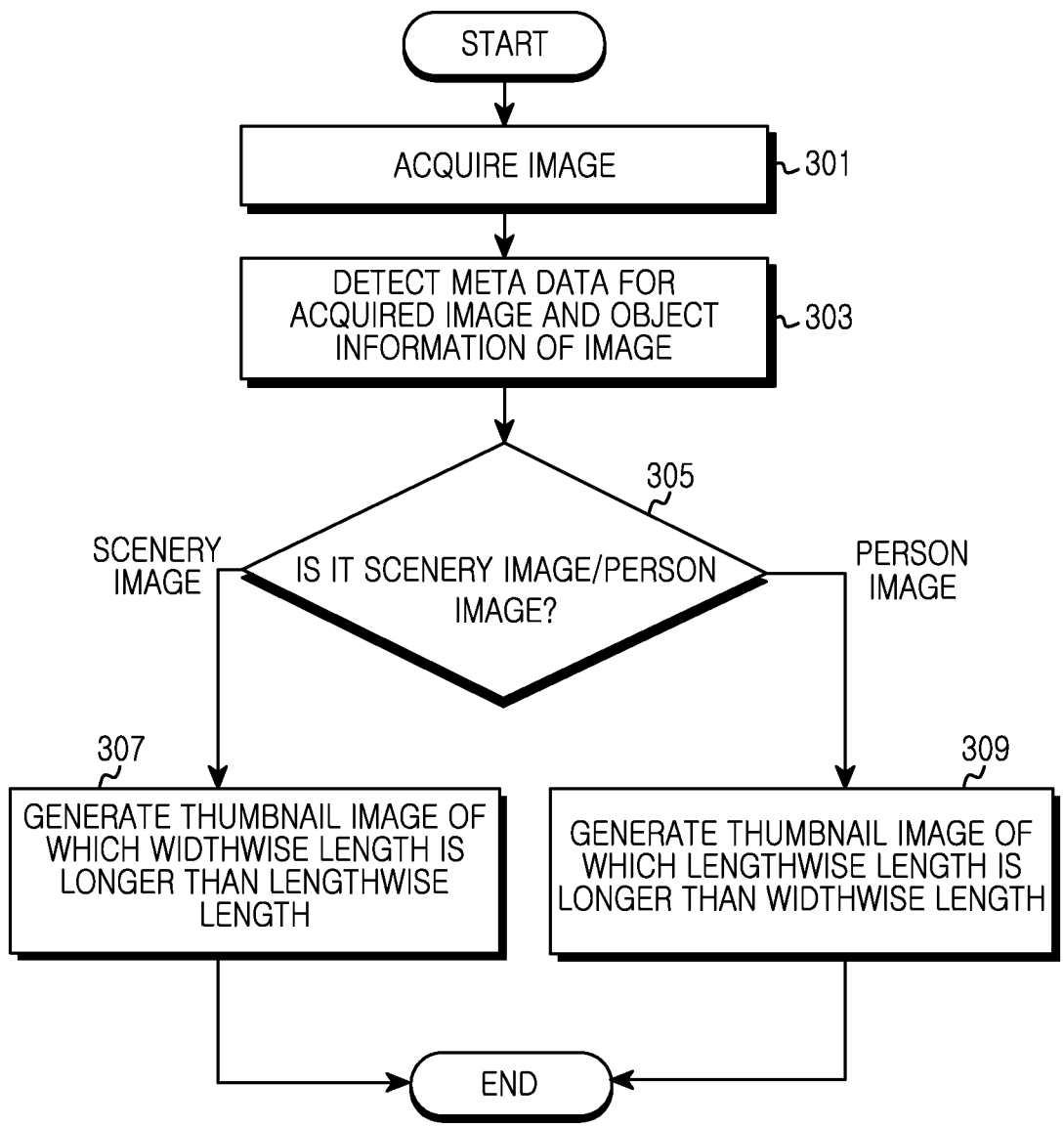
FIG. 3 illustrates a process of generating a thumbnail image on the basis of object information and meta data of an image in an electronic device according to an exemplary embodiment of the present invention.

FIG. 3 illustrates a process of generating a thumbnail image on the basis of object information and meta data of an image in an electronic device according to an exemplary embodiment of the present invention.

Referring to FIG. 3, an electronic device 100 acquires an image in step 301. In this case, the acquired image and any associated meta data may be captured by a camera (not shown), may be received from another electronic device or otherwise loaded from memory 110.

In step 303, the electronic device 100 reads meta data for the acquired image and object information of the image. In step 305, the electronic device 100 determines whether the acquired image is a scenery image or a person image. For example, the electronic device determines whether the acquired image is a scenery image or a person image based on a face detecting scheme. Determining whether an acquired image is a scenery image or a personal image is well known in the art that can be performed a variety of ways. For example, the electronic device uses a face detecting scheme. In this embodiment, if an object of an image indicated by the meta data is different from an object indicated by object information, the electronic device 100 may determine a representative object of the image and a type of the image on the basis of information having a high priority between the meta data and the object information. In one example, if the meta data for the image confirms that the image is captured in a scenery mode whereas a result of detecting the object of the image confirms that a person is included in the image, the electronic device 100 can recognize a representative object of the image as the person according to object information having a high priority, and thus can determine the image as a person image. Conversely, if the meta data for the image confirms that the image is captured in a person mode whereas a result of detecting the object of the image confirms that the object indicated by the image is a scenery, the electronic device 100 can recognize a representative object of the image as the scenery according to object information having a high priority, and thus can determine the image as a scenery image. In a less preferred embodiment, the electronic device 100 can ignore the meta data for the image and simply perform the recognition as scenery image or person image.

In addition, if focus information of meta data and object information for an image are used to determine whether the image is a scenery image or a person image, the electronic device 100 recognizes a representative object of the image around a center point of an area indicated by the focus information. For one example, if a person is detected within a threshold distance of the area indicated by the focus information, the electronic device 100 may recognize the representative object of the image as the person and thus determine the image as a person image. For another example, if the person is not detected within the threshold distance of the area indicated by the focus information, the electronic device 100 may recognize the representative object of the image as a scenery and thus determine the image as a scenery image. More particularly, the electronic device 100 can use the focus information to determine the "focal length" or distance from the center of the focus to the lens to assist in determining if the image is a person image or a scenery image. For example, if the face detection function determines that an object at the focal length resembles a face, the electronic device 100 can determine that the image is a person image. In contrast, if no face is detected at the focal length, the electronic device can assume that the image is a scenery image. Although less preferred, the electronic device 100 may be programmed to skip the face detection function altogether, and assume that a focal length of less than, e.g., 10 m, 20 m or 2 m, is a person image and any image with a focal length of greater than that distance is a scenery image.

In particular, if the object information is included in the meta data, the electronic device 100 may determine the image on the basis of the meta data without confirming the object information. For example, if a face of a person is recognized by using a face recognition function when capturing an image, object information is included in meta data for the captured image, and thus the electronic device 100 can determine that a representative object of the image is the person instead of performing an additional process of confirming object information.

Figure 5:
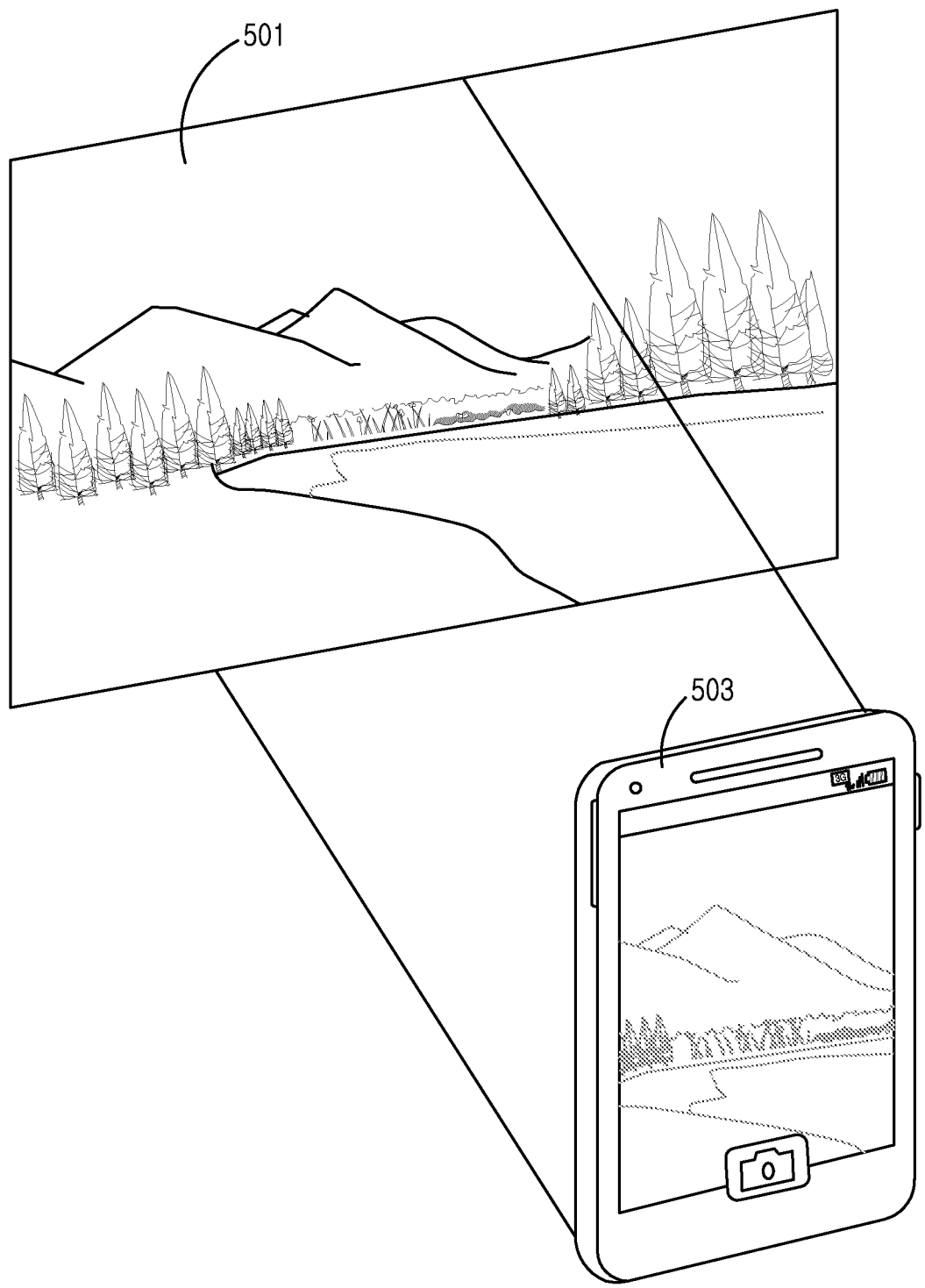
FIG. 5 illustrates an example of capturing a scenery image in an electronic device according to an exemplary embodiment of the present invention.
Figure 6:
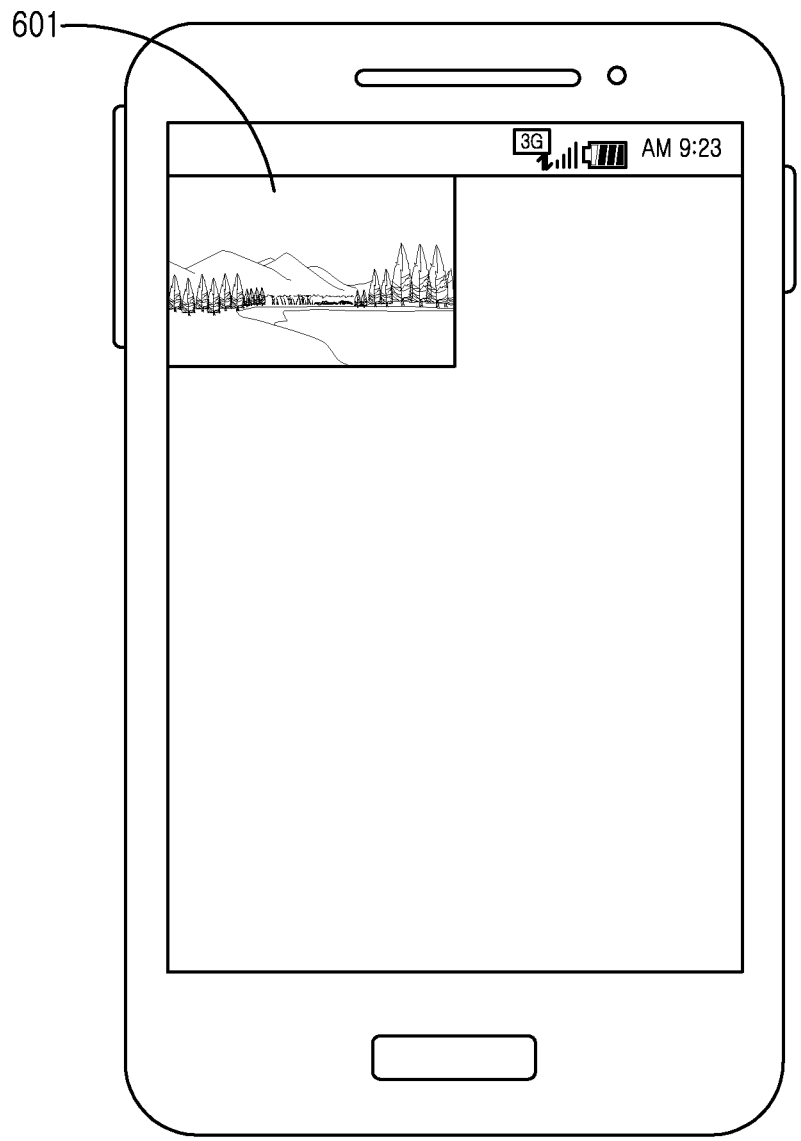
FIG. 6 illustrates a thumbnail image generated in an electronic device according to an exemplary embodiment of the present invention.

If the image is determined as a scenery image in step 305, proceeding to step 307, the electronic device 100 can generate a thumbnail image of a portrait type in which a widthwise length is longer than a lengthwise length, and then the procedure of FIG. 3 ends. In this case, a ratio of the generated thumbnail image may be the same ratio as a ratio of an image captured in a landscape mode of the electronic device 100, thus preserving the original aspect ratio. For example, as illustrated in FIG. 5, if a scenery 501 is captured in a portrait mode 501 of the electronic device 100, the electronic device 100 can confirm that a representative object of the captured image is a scenery on the basis of meta data and object information of the image, and as illustrated in FIG. 6, can generate a thumbnail image 601 having the same ratio as a ratio of an image captured in a landscape mode of the electronic device 100.

If the image is determined as a person image in step 305, proceeding to step 309, the electronic device 100 can generate a thumbnail image of a landscape type in which a lengthwise length is longer than a widthwise length, and then the procedure of FIG. 3 ends. In this case, a ratio of the generated thumbnail image may be the same ratio as a ratio of an image captured in a portrait mode of the electronic device 100, thus preserving the original aspect ratio.

Figure 4:
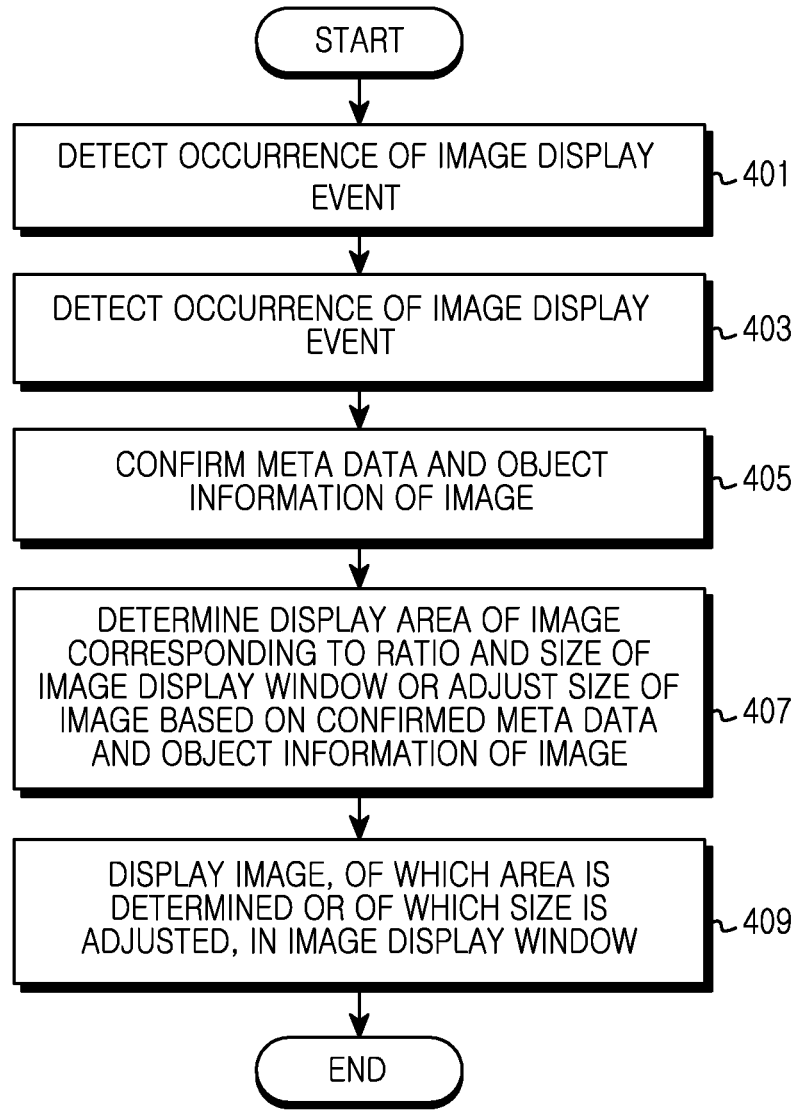
FIG. 4 illustrates an example of displaying an image with a size optimized to a size of a display window in an electronic device according to an exemplary embodiment of the present invention.

FIG. 4 illustrates an example of displaying an image with a size optimized to a size of a display window in an electronic device according to an exemplary embodiment of the present invention.

In step 401, an electronic device 100 detects the occurrence of an image display event. In this case, the image display event may occur according to a widget or application related to an image display.

In step 403, the electronic device 100 confirms a ratio and size of an image display window in which the image is to be displayed. For example, if a gallery application is executed, the electronic device 100 confirms an aspect ratio and size of the image display window provided by the gallery application.

In step 405, the electronic device 100 confirms meta data and object information of the image. More specifically, the electronic device 100 confirms an image capture time, face recognition information, an exposure value, a flash availability, focus information, a resolution, an image size, and a capture mode from the image, and confirms whether an objected indicated by the image is a person or a scenery as indicated by the meta data. The electronic device 100 can acquire object information by using a well-known image recognition algorithm and an image recognition algorithm.

In step 407, the electronic device 100 determines a display area of an image corresponding to the ratio and size of an image display window or adjusts a size of the image on the basis of the confirmed meta data and object information of the image. More particularly, the electronic device 100 confirms the ratio and size of an image display window, determines a representative area of the image on the basis of the meta data and object information of the image, and thereafter clips off or crops the image or adjusts the size of the image so that the determined representative area of the image can be fully displayed in the display window. In one embodiment, the electronic device 100 may confirm a ratio and size of a window provided by the gallery application, and thereafter may determine a representative area of the image on the basis of the meta data and object information of the image to cut off the image so that the representative area is fully displayed in the window provided by the gallery application. In another embodiment, the electronic device 100 may confirm a ratio and size of a window provided by the gallery application, and thereafter may determine a representative area of the image on the basis of the meta data and object information of the image to increase or decrease the image so that the representative area is fully displayed in a window provided by the gallery application. In this case, the method of cutting off the image or adjusting the size of the image is not limited to the above method, and thus the electronic device 100 may first cut off the image according to the size of the display window and then adjust the size, or may first adjust the size and then cut off the image.

In step 409, the electronic device 100 displays the image, of which an area is determined or of which a size is adjusted, in the image display window and thereafter the procedure of FIG. 4 ends.

Figure 7:
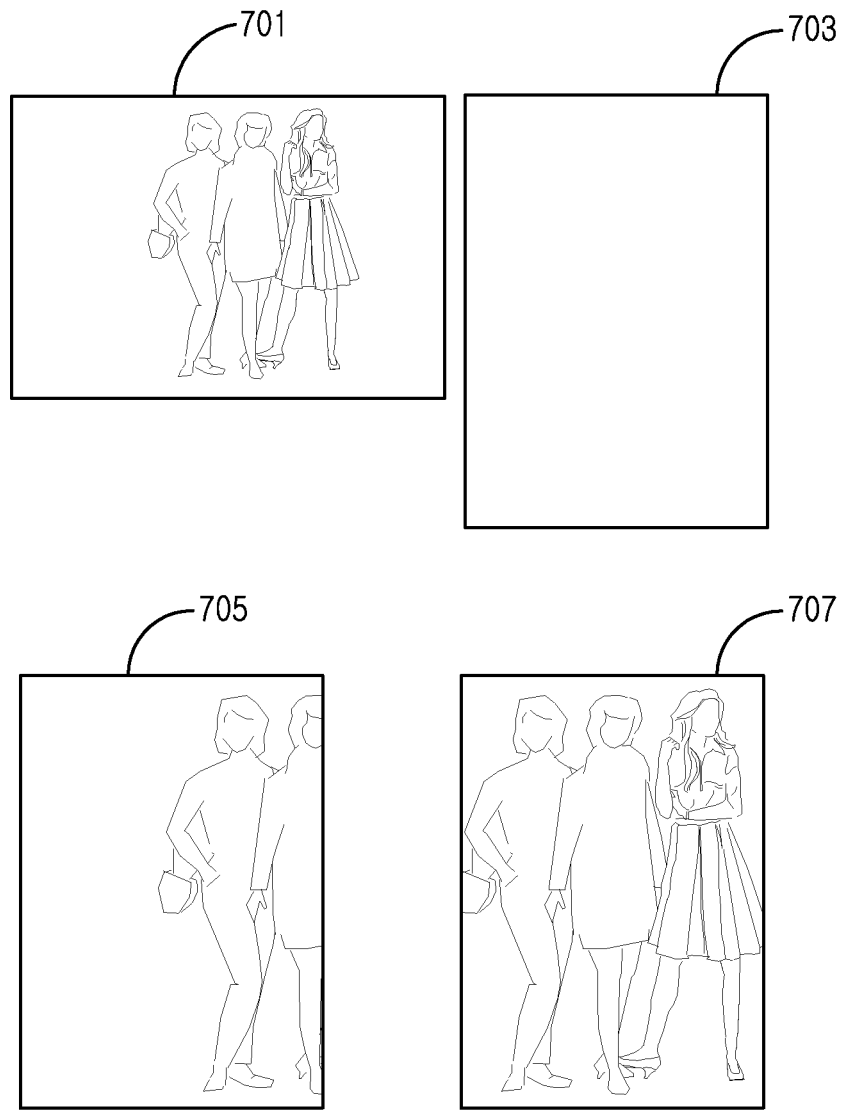
FIG. 7 illustrates an example of displaying a person image with a size optimized to a size of a display window in an electronic device according to an exemplary embodiment of the present invention.
Figure 8:
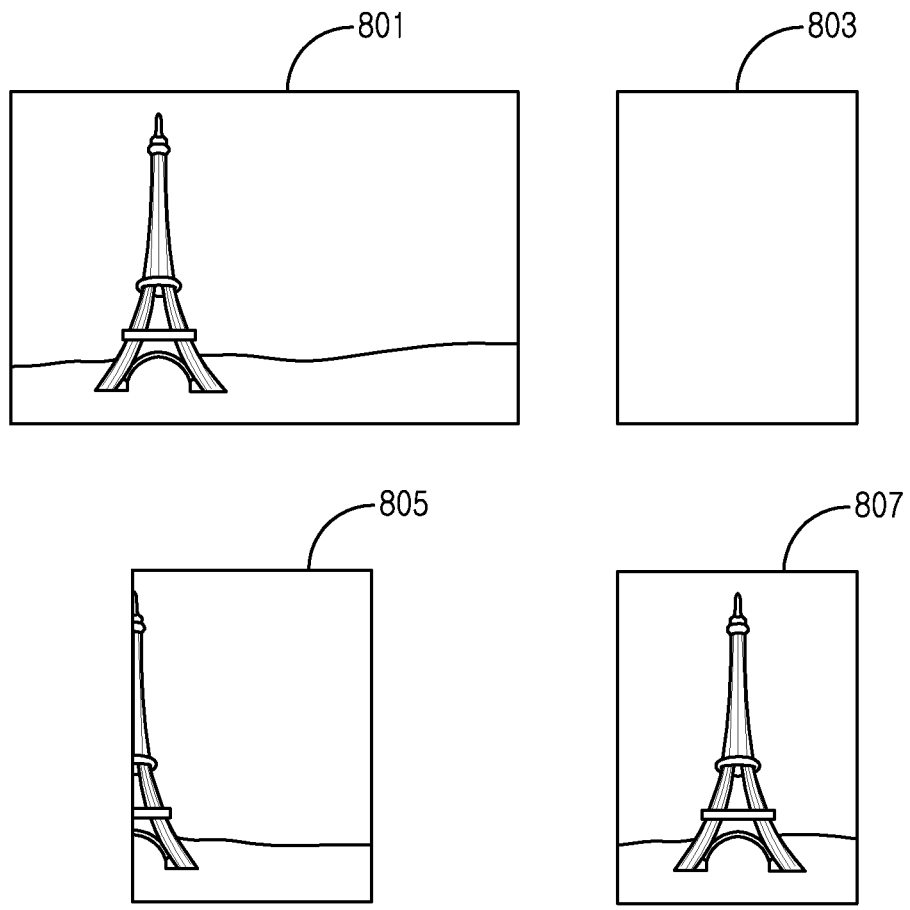
FIG. 8 illustrates an example of displaying a scenery image with a size optimized to a size of a display window in an electronic device according to another exemplary embodiment of the present invention.
Figure 9:
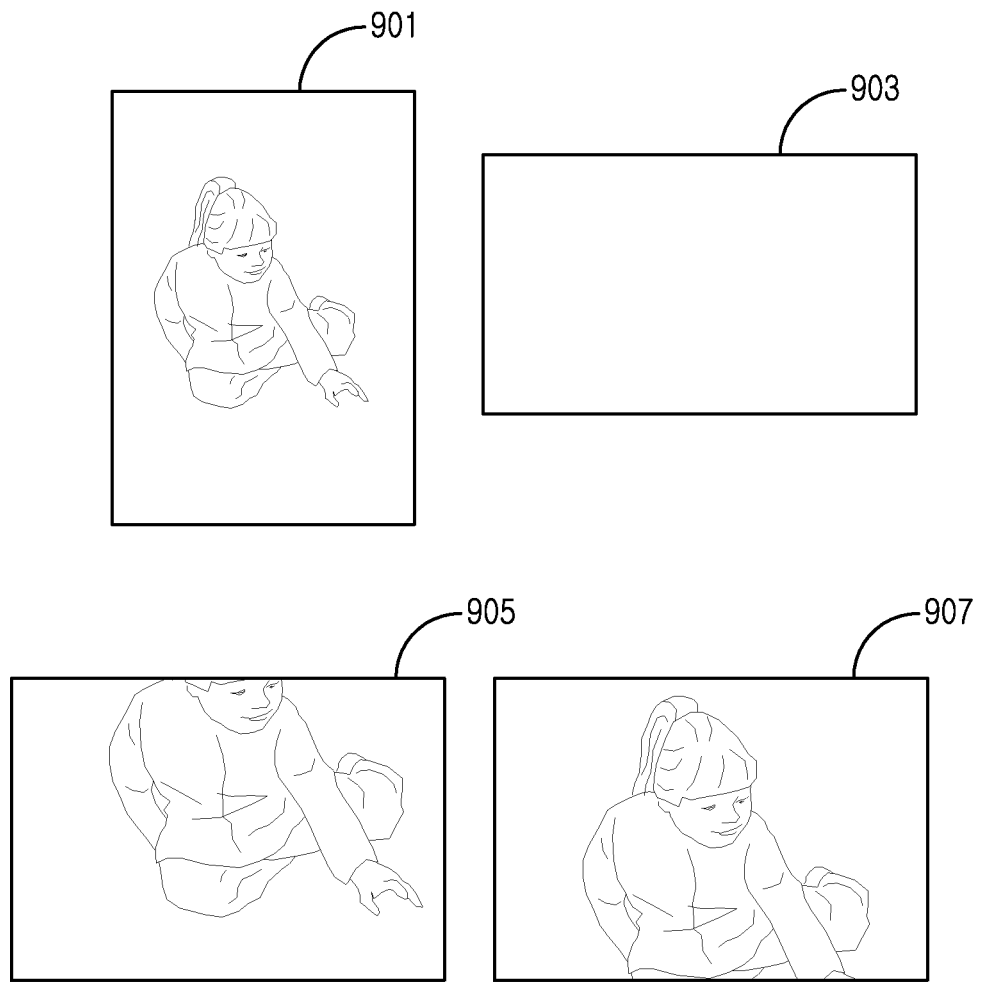
FIG. 9 illustrates an example of displaying a scenery image with a size optimized to a size of a display window in an electronic device according to another exemplary embodiment of the present invention.

In the embodiment illustrated in FIG. 7, if a person image 701 captured in a landscape type is displayed in a portrait-type display window 703, the conventional electronic device provides an image 705 including only a part of a face area of the person. However, the electronic device 100 according to the exemplary embodiment of the present invention can provide an image 707 including a whole face area of the person on the basis of meta data and object information for the image. In the embodiment as illustrated in FIG. 8, if an object image 801 is captured in a landscape type is displayed in a portrait-type display window 803, the conventional electronic device provides an image 805 including only a part of an object area. However, the electronic device 100 according to the exemplary embodiment of the present invention can provide an image 807 including a whole part of the object area on the basis of meta data and object information for the image. In the embodiment illustrated in FIG. 9, if a person image 901 captured in a portrait type is displayed in a landscape-type display window 903, the conventional electronic device provides an image 905 including only a part of a face area of the person. However, the electronic device 100 according to the exemplary embodiment of the present invention can provide an image 907 including a whole face area of the person on the basis of meta data and object information for the image.

The electronic device 100 of the present invention may perform the aforementioned process whenever the image display event occurs or only when the image display event initially occurs. That is, since an image is stored by cutting off the image or adjusting a size of the image according to a size of a display window at a time when the image display event initially occurs, the electronic device 100 can use a pre-stored image when the image display event occurs at a later time.

Although a method of generating a thumbnail image by recognizing a person or a scenery only when a representative object indicated by an image is the person or the scenery is described above for convenience of explanation, the present invention is not limited thereto. It is also possible to apply a method of generating a thumbnail image by recognizing a thing when the representative object indicated by the image is the thing.

Embodiments and all of the functional operations of the present invention described in this specification may be implemented in computer software, firmware, or hardware, including the structures disclosed in this specification and their structural equivalents, or in combinations of one or more of them. Further, the embodiments of the present invention described in this specification may be executed by one or more computer program products, i.e., an electronic device, a data processing device, etc., or may be implemented in one or more modules of computer program instructions encoded on a computer readable medium for controlling an operation of these devices.

The computer readable medium may be a machine-readable storage medium, a machine-readable storage substrate, a memory device, a composition of matter effecting a machine-readable propagated stream, or a combination of one or more of them. The term "data processing device" includes, for example, a programmable processor, a computer, or multiple processors or all apparatus, devices, and machines for processing data, including the computer. The apparatus may include, in addition to hardware, code that generates an execution environment for the computer program, e.g., code that constitutes processor firmware, a protocol stack, a database management system, an operating system, or a combination of one or more of them.

The above-described methods according to the present invention can be implemented in hardware, firmware or as software or computer code that is stored on a non-transitory machine readable medium such as a CD ROM, a RAM, a floppy disk, a hard disk, or a magneto-optical disk or computer code downloaded over a network originally stored on a remote recording medium or a non-transitory machine readable medium and stored on a local non-transitory recording medium, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" constitute hardware in the claimed invention. Under the broadest reasonable interpretation, the appended claims constitute statutory subject matter in compliance with 35 U.S.C. §101 and none of the elements consist of software per se.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method comprising:
   extracting metadata from an image having a first aspect ratio;
   selecting, by an electronic device, a second aspect ratio based on the metadata;
   generating, by the electronic device, a thumbnail having the second aspect ratio by cropping the image; and
   displaying the thumbnail in an image display window of the electronic device;
   wherein the metadata includes focus information and the second aspect ratio is selected, at least in part, based on the focus information.

2. The method of claim 1, further comprising extracting object information from the image, wherein the second aspect ratio is also selected based on the object information, when the object information does not conflict with the metadata.

3. The method of claim 2, wherein the object information indicates that an object of the image comprises at least one of a person and a scenery.

4. The method of claim 1, further comprising detecting whether the image depicts a person based on the metadata, wherein the second aspect ratio is a portrait-type aspect ratio when the image depicts the person.

5. The method of claim 4, further comprising detecting whether the image depicts a scenery based on the metadata, wherein the second aspect ratio is a landscape-type aspect ratio when the image depicts the scenery.

6. The method of claim 2, further comprising:
   detecting a conflict between the metadata and the object information; and
   detecting respective priorities that are assigned to the metadata and the object information;
   wherein the second aspect ratio is selected based on the metadata only when the metadata is assigned a higher priority than the object information.

7. The method of claim 1, wherein the second aspect ratio is different from the first aspect ratio.

8. The method of claim 1, wherein the second aspect ratio is a portrait-type aspect ratio when at least one face of a person is depicted in the image.

9. The method of claim 8, wherein the second aspect ratio is a landscape-type aspect ratio when the image does not depict the at least one face.

10. The method of claim 1,
    wherein the second aspect ratio is selected based on a size of the image display window.

11. An electronic device comprising a display screen and a processor configured to:
    extract metadata from an image having a first aspect ratio;
    select a second aspect ratio based on the metadata;
    generate a thumbnail having the second aspect ratio by cropping the image; and
    display the thumbnail on the display screen;
    wherein the metadata includes focus information and the second aspect ratio is selected, at least in part, based on the focus information.

12. The electronic device of claim 11, wherein the processor is further configured to extract object information from the image, and the second aspect ratio is also selected based on the object information, when the object information does not conflict with the metadata.

13. The electronic device of claim 12, wherein the object information indicates that an object of the image comprises at least one of a person and a scenery.

14. The electronic device of claim 11, wherein the processor is further configured to detect whether the image depicts a person based on the metadata, wherein the second aspect ratio is a portrait-type aspect ratio when the image depicts the person.

15. The electronic device of claim 14,
    wherein the processor is further configured to detect whether the image depicts a scenery based on the metadata, wherein the second aspect ratio is a landscape-type aspect ratio when the image depicts the scenery.

16. The electronic device of claim 12, wherein the processor is further configured to:
    detect that the metadata conflicts with the object information; and
    detect respective priorities that are assigned to the metadata and the object information;
    wherein the second aspect ratio is selected based on the metadata only when the metadata is assigned a higher priority than the object information.

17. The electronic device of claim 11, wherein the second aspect ratio is different from the first aspect ratio.

18. The electronic device of claim 11, wherein the second aspect ratio is a portrait-type aspect ratio when at least one face of a person is depicted in the image.

19. The electronic device of claim 18, wherein the second aspect ratio is a landscape type aspect ratio when the image does not depict the at least one face.

20. The electronic device of claim 11, wherein the second aspect ratio is selected based on a size of an image display window.

* * * * *